Patented July 8, 1952

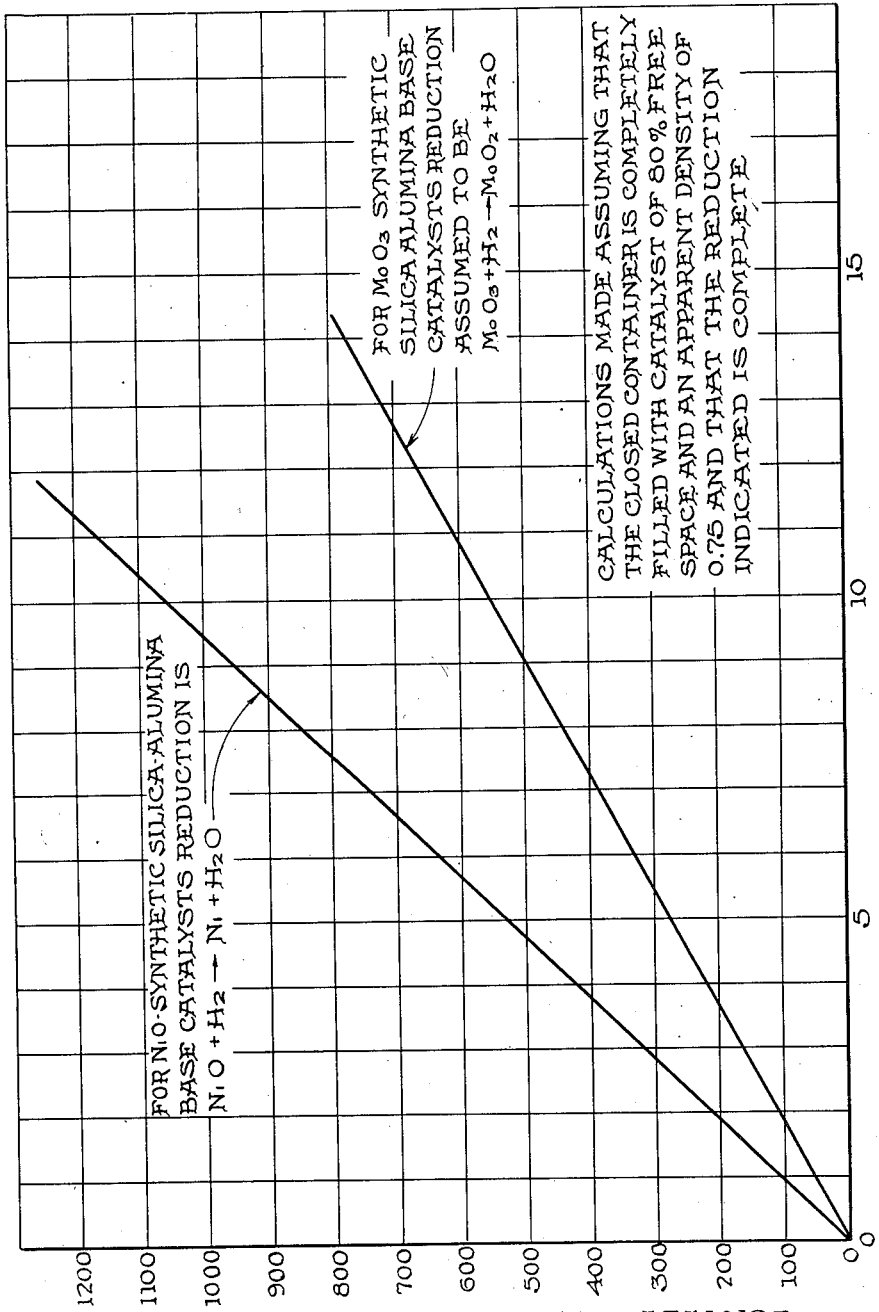

2,602,773

UNITED STATES PATENT OFFICE 2,602,773

DESTRUCTIVE HYDROGENATION

Joseph B. McKinley and William C. Starnes, Pittsburgh, Pa., assignors to Gulf Research & Development Company, Pittsburgh, Pa., a corporation of Delaware Application December 8, 1948, Serial No. 64,185

9 Claims. (Cl. 196—53)

This invention relates to improved destructive hydrogenation procedure.

The destructive hydrogenation of low grade carbonaceous materials such as refractory gas oil, coal tars, mineral oil tars, etc. in order to convert them into products of higher value such as gasoline, has been known for a considerable period of time. The procedure generally involves contacting the hydrocarbon material with a hydrogenating catalyst and hydrogen at elevated pressure and temperature. In recent times it has been known to employ a combination catalyst comprising hydrogenating and active cracking components. It is common practice to periodically regenerate the catalyst to remove contaminating material deposited thereon such as carbon and tars. This is accomplished by terminating the above-described operation when the catalyst activity decreases, depressuring the reactor, flushing the catalyst bed with an inert oxygen-free gas such as nitrogen to remove volatile hydrocarbons, and passing an oxygen-containing gas over the contact at elevated temperature to remove the carbonaceous material by oxidation or combustion. It is common practice to pressure-up the reactor containing the regenerated catalyst, after nitrogen flushing, at near the reaction temperature with hydrogen and then to go "on stream" pumping the hydrocarbon and hydrogen mixture over the catalyst. It has been found that the metal oxide of the hydrogenating component of the catalyst reduces rapidly during these operations involving its re-use, and particularly during the pressuring-up operation, to yield relatively high partial pressures of steam.

We have found that the high pressure steam, which is formed by reduction of the hydrogenating metal oxide during its re-use in destructive hydrogenation operations, results in a permanent deactivation of a catalyst of the type comprising a hydrogenating component and an active cracking carrier base. We have also found that this undesirable deactivation can be avoided by treating such a catalyst after the regeneration with hydrogen sulfide to at least partially convert the hydrogenating component of the catalyst into sulfide. Water vapor is formed during this hydrogen sulfide treatment but the partial pressure of the water vapor is prevented from rising to an extent which will cause material deactivation of the catalyst. The conversion to the sulfide may be complete or partial but the amount of hydrogenating metal oxide left unsulfided should be insufficient to form a partial pressure of water vapor which will cause a material deactivation of the catalyst when the catalyst is re-used in the destructive hydrogenation process.

In the following examples and description we have set forth several of the preferred embodiments of our invention but it is to be understood that they are given by way of illustration and not in limitation thereof.

To illustrate the extent of deactivation by steam of a destructive hydrogenation catalyst comprising a hydrogenating metal oxide and an active cracking catalyst, we have carried out a series of experiments with a catalyst containing nickel monoxide deposited on a synthetic silica-alumina cracking catalyst, the nickel monoxide being 8.3 per cent by weight of the composite. This catalyst was prepared by impregnating a co-precipitated silica-alumina catalyst with a nickel nitrate aqueous solution followed by drying and calcining. Separate portions of this catalyst were treated with varying partial pressures of steam at 800° F. and at an approximately constant partial pressure (1790–2085 p. s. i.) of hydrogen for one hour. The sample of catalyst (30 grams) to be treated was placed in a 1875 ml. bomb which was heated to treatment temperature and charged with sufficient water and hydrogen to give the desired steam and hydrogen partial pressures. A correction was made for the steam which would be formed by the rapid reduction of the nickel oxide under the treating conditions. At the end of the treating period the steam and hydrogen were vented from the bomb which was then thoroughly flushed with prepurified nitrogen and evacuated. The bomb was cooled and the catalyst recovered from it was recalcined in air at 900° F. in a standardized manner and then used in the hydrocracking runs described in Table I to test its hydrocracking activity. The results and the manner of conducting the tests are given in Table I.

TABLE I

*Effect of steam partial pressure during steaming-reduction on the activity of an 8.3% NiO–91.7% synthetic silica-alumina catalyst [1]*

| Run. No. | 1 | 2 | 3 | 4 | 5 |
|---|---|---|---|---|---|
| Catalyst: | | | | | |
| Pretreatment Given | None | 30 p. s. i. Steam +2085 p. s. i. H$_2$ | 54 p. s. i. Steam +2000 p. s. i. H$_2$ | 110 p. s. i. Steam +1955 p. s. i. H$_2$ | 175 p. s. i. Steam +1790 p. s. i. H$_2$. |
| Surface Area, M$^2$/g | 245.0 | 215.3 | | | 174.8. |
| Products (Weight Per Cent of Cycle Stock): | | | | | |
| Gasoline | 41.8 | 42.2 | 40.9 | 38.3 | 37.5. |
| Gasoline and Gas | 53.6 | 52.9 | 50.6 | 46.6 | 46.1. |
| Hydrogen Consumption (Weight Per Cent of Cycle Stock). | 2.08 | 2.15 | 2.03 | 1.92 | 1.78. |

[1] Tests were made charging 175.0 g. of light cycle stock from a catalytic cracking operation; 13.6 g. of catalyst, dried in air at 900° F. for approximately one hour immediately before use, and 8.5–8.7 g. of hydrogen to an 1875-ml. rocking bomb. Each run involved a set heating of the bomb to reaction temperature (812° F.), a set heating period at this temperature, and a set cooling to room temperature. The maximum reaction pressure was ca. 2000 p. s. i. in each run. The catalyst was prepared by vacuum impregnating the synthetic silica-alumina cracking catalyst, precalcined overnight at 1000° F., with an aqueous nickel nitrate solution. The impregnated base was then dried at 136° C. for 20 hours and calcined overnight at 900° F. The surface area of the catalyst in runs 3 and 4 was not determined.

It is evident from the foregoing that a catalyst comprising a hydrogenating component deposited on a cracking base is undesirably affected as regards activity and surface area by high partial pressures of steam and especially by partial pressures above about 30 pounds p. s. i.

The inspection on the charge stock used in the above experiments is given in Table II.

TABLE II

*Inspections of light cycle charge stock*

| | |
|---|---|
| Sp. gr. at 60°/60° F | 0.8713 |
| Viscosity, SUS at 100° F | 36.2 |
| Sulfur, percent | 0.20 |
| Refractive index, $n_D^{20}$ | 1.4938 |
| Aniline pt., ° F | 122.7 |
| Bromine No | 4.4 |
| Molecular weight (average) | 209 |
| Composition (weight percent): | |
| Naphthenes and paraffins | 13.7 |
| Olefins | 3.1 |
| Aromatics | 63.2 |
| Distillation: | |
| Weight percent to 180° F. at 10 mm. (Gasoline) | 3.4 |
| Weight percent above 180° F. at 10 mm. (gas oil) | 96.6 |

Calculations were carried out to determine the partial pressures of steam which may be developed when a typical destructive hydrogenation catalyst of this type is pressured-up with hydrogen under conditions corresponding to those normally employed in commercial destructive hydrogenation operations, i. e., a temperature of about 800° F. and a hydrogen pressure of 2000 p. s. i. It was assumed that a sample of a catalyst comprising nickel monoxide or molybdenum trioxide, as the case may be, on a synthetic silica-alumina cracking catalyst was exposed to the conditions mentioned above and the amount of steam which could be formed by the ensuing reduction was calculated. The results are plotted in the accompanying drawing from which it may be seen that partial pressures of steam greatly in excess of 30 pounds are formed when destructive hydrogenation catalyst of this type are exposed to hydrogen under conventional destructive hydrogenation conditions.

The treatment with hydrogen sulfide, in order to avoid the above-described harmful effects of water vapor, must be carried out in such a manner that the partial pressure of the water vapor formed during the hydrogen sulfide treatment does not rise sufficiently high to cause material deactivation. In general the partial pressure of water vapor formed during the hydrogen sulfide treatment should be kept below approximately 30 pounds. The sulfide treatment may be complete, i. e., all of the hydrogenating component may be converted into sulfide. However, this is not necessary and in some cases it is beneficial to only partially sulfide. In any event the sulfiding should be carried to a point such that harmful amounts of water vapor will not be formed when the catalyst is used for destructive hydrogenation. In other words, sufficient sulfiding should take place so that the partial pressure of water vapor formed will be below approximately 30 p. s. i. when the catalyst is re-used in the destructive hydrogenation process. Straight hydrogen sulfide may be used or may be mixed with an inert diluent such as nitrogen. The hydrogen sulfide or the mixture containing it can be merely passed over or through the contact which should be at elevated temperature sufficient to cause rapid formation of the sulfide. The sulfiding can take place at atmospheric pressure or at elevated pressure. In some instances it is advantageous to start the treatment at atmospheric pressure and then to gradually increase the pressure. Control of the partial pressure of water vapor is conveniently accomplished by regulating the space velocity of the hydrogen sulfide gas or mixture passed over the catalyst, i. e., the higher the space velocities, the lower the partial pressure of water vapor. The same result is accomplished by regulating the amount of H$_2$S—i. e., the smaller the amount of H$_2$S in the gas mixture, flowing over the contact at a given space velocity, the lower will be the partial pressure of the water vapor. Ordinarily the hydrogen sulfide treatment is applied immediately after regeneration and flushing so that added heat is not required, the catalyst being at a high temperature immediately after the termination of the regeneration and flushing procedure. Sulfiding takes place rapidly and this is one of the advantages of the invention.

The degree of sulfiding necessary for a catalyst will depend upon the amount of hydrogenating component on the catalyst, the ease of its reaction with hydrogen to give steam after partial sulfiding, the temperature of the subsequent hydrogen repressuring and destructive hydrogenation operations which will effect the rate of steam formation, etc. It is possible to experimentally determine rate curves for sulfiding of various hydrogenating metals and to use this information to determine when the desired amount of sulfiding has been accomplished in view of the exact method which is to be employed in putting the reactor back on stream. Similar curves can be constructed from experimental data representing rates of reduction of partially sulfided contacts to form steam under pressure, and it can thus be determined how fast reduction of a catalyst will proceed during pressuring-up and subsequent destructive hydrogenation operations and to what extent pre-sulfiding must be carried so that the amount of water formed during the pressuring-up period will give a negligible steam partial pressure. Because of the many factors involved, as pointed out above, it is not possible to set forth pre-sulfiding conditions which will give optimum results with every contact and every destructive hydrogenation process. However optimum conditions will usually be between about 0.25 and 4 hours, between about 600° and 1000° F. and space velocities of between 500 and 2000 (gas measured at standard conditions).

In some destructive hydrogenation procedures, it is known to carry out the regeneration process at high pressures, about the same as those used in the destructive hydrogenation, by using air-flue gas mixtures for the combustion. The catalyst bed is flushed, after the regeneration, with nitrogen at reaction pressure and then the oil and hydrogen are flowed together into the pressured reactor displacing the nitrogen. Our invention is also of value in connection with such a process. For example, after displacing the air-flue gas mixture with high-pressure nitrogen, high pressure nitrogen plus a small partial pressure of hydrogen sulfide may be passed through the reactor until a desired degree of sulfiding of the catalyst has been obtained. Then the flow of hydrocarbon or the like and hydrogen through the catalyst bed may be started. The desired degree of sulfiding is such that the partial pressure of the steam formed in subsequent operations is low enough so as not to deactivate the catalyst. Other similar applications, such as will be apparent to those skilled in the art, are possible.

The process of our invention is applicable in general to sulfiding the hydrogenating component of a combined catalyst comprising said hydrogenating component and an active cracking catalyst component and wherein the hydrogenating component is in the oxide form after the regeneration and is reduced to the metal or to a lower oxide form with concomitant formation of water vapor when exposed to hydrogen under destructive hydrogenation conditions. Examples of such catalysts are metals of the iron group, for instance nickel or cobalt, or metals of group VIa of the periodic system, such as molybdenum deposited upon active cracking catalysts such as co-precipitated silica-alumina catalysts, silica-alumina-zirconia cracking catalysts or silica-alumina cracking catalyts derived from natural sources such as calcined acid-treated naturally-occurring montmorillonite.

EXAMPLE

As a specific example of the sulfiding method of protecting the activity of a hydrocracking catalyst, an 8.2 per cent NiO-91.8 per cent synthetic silica alumina catalyst was sulfided by flowing a 12.7 mol per cent hydrogen sulfide-87.3 mol per cent nitrogen stream over it at a 575 space velocity for one hour at 900° F. at atmospheric pressure.

The term "space velocity" as used herein is the number of units of gaseous material, measured at 0° C. and 760 mm. of mercury, contacted with a unit volume of catalyst per hour. This sulfiding treatment has been found adequate to convert substantially all of the NiO of the catalyst to NiS. The catalyst was flushed with nitrogen, cooled, and transferred to a continuous destructive hydrogenation apparatus. It filled two-thirds of the catalyst case. The case was then pressured-up with 2000 p. s. i. of hydrogen at 900° F. for one hour. The following tabulation compares the activity of the catalyst so obtained with the activity of the same, but unsulfided, catalyst subjected to the same hydrogen pressuring and testing operation. Activities are judged by gasoline formation from light cycle stock (similar to that described in Table II) during a standardized destructive hydrogenation treatment.

| Catalyst Employed | Gasoline Formation During Hydrocracking, Weight per cent of the Cycle Stock |
| --- | --- |
| Presulfided and pressured with hydrogen | 41.7 |
| Pressured with hydrogen without intermediate treatment | 33.3 |

It is apparent that presulfiding protects the hydrocracking activity of the catalyst when it is pressured-up with hydrogen.

An alternative process is described in our cofiled application Serial No. 64,184, which comprises preliminary reduction with hydrogen at low pressure and then pressuring-up with hydrogen. This would avoid catalyst deactivation by high partial pressures of steam. It is sometimes advantageous to combine the hydrogen and hydrogen sulfide pretreatments. Thus presulfiding followed by prereduction can be used to eliminate or minimize the amount of hydrogen sulfide formed during pressuring-up and onstream operation. Treatment with hydrogen sulfide will convert the oxide to the sulfide which would decompose during pressuring-up or onstream to give hydrogen sulfide which would contaminate the product. Following the sulfiding, treatment with hydrogen at low pressure will convert the sulfide to the metal or a stable lower sulfide and the hydrogen sulfide formed during the hydrogen treatment can be readily removed from the system. Simultaneous prereduction and presulfiding, using a mixture of hydrogen and hydrogen sulfide, can produce a catalyst which will not liberate hydrogen sulfide during pressuring-up and during destructive hydrogenation.

What we claim is:

1. In a process for the destructive hydrogenation of a carbonaceous material in the presence of a reducible hydrogenating catalyst deposited upon an active cracking catalyst carrier, which combined catalyst is periodically regenerated to remove, by oxidation, carbonaceous material deposited thereon and the regenerated catalyst is re-used in the destructive hydrogenation process, the improvement which comprises treating the regenerated catalyst with hydrogen sulfide to at least partially convert the oxidized hydrogenating component of the catalyst into sulfide, preventing the partial pressure of water vapor formed during this treatment from rising to an amount which will cause material deactivation of the catalyst, and continuing such treatment until the amount of hydrogenating component remaining in the oxide form is insufficient to form a partial pressure of water vapor which will cause a material deactivation of the catalyst when the catalyst is re-used in the destructive hydrogenation process.

2. In a process for the destructive hydrogenation of a carbonaceous material in the presence of a reducible hydrogenating catalyst deposited upon an active cracking catalyst carrier, which combined catalyst is periodically regenerated to remove, by oxidation, carbonaceous material deposited thereon and the regenerated catalyst is re-used in the destructive hydrogenation process, the improvement which comprises treating the regenerated catalyst with hydrogen sulfide to at least partially convert the oxidized hydrogenating component of the catalyst into sulfide, preventing the partial pressure of water vapor formed during this treatment from rising to an amount which will cause material deactivation of the catalyst, and continuing such treatment until the amount of hydrogenating component remaining in oxide form will result in a partial pressure of water vapor of less than about 30 p. s. i. when the catalyst is re-used in the destructive hydrogenation process.

3. In a process for the destructive hydrogenation of a carbonaceous material in the presence of a catalyst having cracking catalyst and reducible hydrogenating catalyst components, which combined catalyst is periodically regenerated to remove, by oxidation, carbonaceous material deposited thereon and the regenerated catalyst is re-used in the destructive hydrogenation process, the improvement which comprises treating the regenerated catalyst with hydrogen sulfide to at least partially convert the oxidized hydrogenating component of the catalyst into sulfide, maintaining the partial pressure of water vapor formed during this treatment below about 30 p. s. i. and continuing such treatment until the amount of hydrogenating component remaining in the oxide form will result in a partial pressure of water vapor of less than about 30 p. s. i. when the catalyst is re-used in the destructive hydrogenation process.

4. In a process for the destructive hydrogenation of a carbonaceous material in the presence of a catalyst having cracking catalyst and reducible hydrogenating catalyst components, which combined catalyst is periodically regenerated to remove, by oxidation, carbonaceous material deposited thereon and the regenerated catalyst is re-used in the destructive hydrogenation process, the improvement which comprises treating the regenerated catalyst with a mixture of hydrogen sulfide and hydrogen to at least partially convert the oxidized hydrogenating component of the catalyst into sulfide and free metal, maintaining the partial pressure of water vapor formed during this treatment below about 30 p. s. i. and continuing such treatment until the amount of hydrogenating component remaining in the oxide form will result in a partial pressure of water vapor of less than about 30 p. s. i. when the catalyst is re-used in the destructive hydrogenation process.

5. In a process for the destructive hydrogenation of a carbonaceous material in the presence of a catalyst having cracking catalyst and reducible hydrogenating catalyst components, which combined catalyst is periodically regenerated to remove, by oxidation, carbonaceous material deposited thereon and the regenerated catalyst is re-used in the destructive hydrogenation process, the improvement which comprises treating the regenerated catalyst with hydrogen sulfide to at least partially convert the oxidized hydrogenating component of the catalyst in the sulfide, treating the sulfided catalyst with hydrogen, maintaining the partial pressure of water vapor formed during this treatment with hydrogen sulfide and hydrogen below about 30 p. s. i. and continuing such treatment until the amount of hydrogenating component remaining in the oxide form will result in a partial pressure of water vapor of less than about 30 p. s. i. when the catalyst is re-used in the destructive hydrogenation process.

6. In a process for the destructive hydrogenation of a hydrocarbon in the presence of a catalyst having cracking catalyst and reducible hydrogenating catalyst components which combined catalyst is periodically regenerated to remove, by oxidation, carbonaceous material deposited thereon and the regenerated catalyst is re-used in the destructive hydrogenation process, the improvement which comprises treating the regenerated catalyst with hydrogen sulfide to at least partially convert the oxidized hydrogenating component of the catalyst into sulfide, maintaining the partial pressure of water vapor formed during this treatment below about 30 p. s. i. and continuing such treatment until the amount of hydrogenating component remaining in the oxide form will result in a partial pressure of water vapor of less than about 30 p. s. i. when the catalyst is re-used in the destructive hydrogenation process.

7. In a process for destructive hydrogenation of a hydrocarbon in the presence of a hydrogenating catalyst of the iron group of the periodic system deposited upon a silica-alumina cracking catalyst carrier which combined catalyst is periodically regenerated to remove, by oxidation, carbonaceous material deposited thereon and the regenerated catalyst is re-used in the destructive hydrogenation process, the improvement which comprises treating the regenerated catalyst with hydrogen sulfide to at least partially convert the oxidized iron group component of the catalyst into sulfide, maintaining the partial pressure of water vapor formed during this treatment below about 30 p. s. i. and continuing such treatment until the amount of iron group metal oxide remaining in the catalyst will result in partial pressure of water vapor of less than about 30 p. s. i. when the catalyst is re-used in the destructive hydrogenation process.

8. In a process for destructive hydrogenation of a hydrocarbon in the presence of a hydrogenating catalyst selected from group VIa of the periodic system deposited upon a silica-alumina cracking catalyst carrier which combined catalyst is periodically regenerated to remove, by oxidation, carbonaceous material deposited thereon and the regenerated catalyst is re-used in the destructive hydrogenation process, the improvement which comprises treating the regenerated catalyst with hydrogen sulfide to at least partially convert the oxidized group VIa component of the catalyst into sulfide, maintaining the partial pressure of water vapor formed during this treatment below about 30 p. s. i. and continuing such treatment until the amount of group VIa metal oxide remaining in the catalyst will result in a partial pressure of water vapor of less than about 30 p. s. i. when the catalyst is re-used in the destructive hydrogenation process.

9. In a process for the destructive hydrogenation of a hydrocarbon in the presence of a nickel catalyst deposited upon an active cracking catalyst carrier which combined catalyst is periodically regenerated to remove, by oxidation, carbonaceous material deposited thereon and the regenerated catalyst is re-used in the destructive hydrogenation process, the improvement which comprises treating the regenerated catalyst with hydrogen sulfide to at least partially convert the nickel component of the catalyst into sulfide, maintaining the partial pressure of water vapor formed during this treatment below about 30 p. s. i. and continuing such treatment until the amount of nickel oxide remaining in the catalyst will result in a partial pressure of water vapor of less than about 30 p. s. i. when the catalyst is re-used in the destructive hydrogenation process.

JOSEPH B. McKINLEY.
WILLIAM C. STARNES.

REFERENCES CITED

The following references are of record in the file of this patent:

UNITED STATES PATENTS

| Number | Name | Date |
|---|---|---|
| 2,131,089 | Beeck et al. | Sept. 27, 1938 |
| 2,232,909 | Gohr | Feb. 25, 1941 |
| 2,307,795 | Kearby | Jan. 12, 1943 |
| 2,334,159 | Friedman | Nov. 9, 1943 |
| 2,358,879 | Redcay | Sept. 26, 1944 |
| 2,369,009 | Bloch et al. | Feb. 6, 1945 |
| 2,377,116 | Voorhies et al. | May 29, 1945 |
| 2,386,050 | Holder | Oct. 2, 1945 |